(12) United States Patent
Lock et al.

(10) Patent No.: US 10,503,751 B2
(45) Date of Patent: *Dec. 10, 2019

(54) FRAGMENTATION FOR RAPID DATA VISUALIZATION

(71) Applicant: SAP SE, Walldorf (DE)

(72) Inventors: Hendrik C. R. Lock, Linkenheim-Hochstetten (DE); Vathsala Arabaghatta Shivarudrappa, Walldorf (DE); Adela Bran, Leimen (DE)

(73) Assignee: SAP SE, Walldorf (DE)

( * ) Notice: Subject to any disclaimer, the term of this patent is extended or adjusted under 35 U.S.C. 154(b) by 658 days.

This patent is subject to a terminal disclaimer.

(21) Appl. No.: 15/294,524

(22) Filed: Oct. 14, 2016

(65) Prior Publication Data
US 2017/0109423 A1    Apr. 20, 2017

Related U.S. Application Data

(60) Provisional application No. 62/242,510, filed on Oct. 16, 2015, provisional application No. 62/242,426, filed on Oct. 16, 2015, provisional application No. 62/270,803, filed on Dec. 22, 2015.

(51) Int. Cl.
| | |
|---|---|
| *G06F 16/26* | (2019.01) |
| *G06F 16/27* | (2019.01) |
| *G06F 16/25* | (2019.01) |
| *G06F 16/22* | (2019.01) |
| *G06F 16/23* | (2019.01) |
| *G06F 16/2455* | (2019.01) |
| *G06F 16/9535* | (2019.01) |
| *G06F 16/2453* | (2019.01) |

(52) U.S. Cl.
CPC ......... *G06F 16/26* (2019.01); *G06F 16/2282* (2019.01); *G06F 16/2365* (2019.01); *G06F 16/2455* (2019.01); *G06F 16/24544* (2019.01); *G06F 16/25* (2019.01); *G06F 16/27* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 5,999,192 | A * | 12/1999 | Selfridge | G06F 16/26 345/440 |
| 7,627,567 | B2 * | 12/2009 | Ganti | G06F 16/258 |
| 10,031,935 | B1 * | 7/2018 | Cole | G06F 16/2315 |
| 2011/0213775 | A1 * | 9/2011 | Franke | G06F 16/278 707/737 |

(Continued)

*Primary Examiner* — Usmaan Saeed
*Assistant Examiner* — Yu Zhao
(74) *Attorney, Agent, or Firm* — Jones Day

(57) ABSTRACT

Systems and methods are provided for fragmentation. A dataset including data records is received. Fragments corresponding to the data records are determined. A fragment identifier table is determined which includes a plurality of fragment codes. Each fragment code uniquely corresponds to each fragment. A fragment having a fragment attributes is selected. Based on the fragment attributes, a fragment boundary set is determined. Each fragment boundary set is unique to each fragment code. An encoded limited cardinality dataset is generated based on the fragment boundary sets for visualization on a client device.

20 Claims, 6 Drawing Sheets

(56) References Cited

U.S. PATENT DOCUMENTS

2014/0280042 A1 9/2014 Lock et al.
2015/0186466 A1* 7/2015 Gaza ................. G06F 16/24544
   707/714

* cited by examiner

FRAGMENTATION FOR RAPID DATA VISUALIZATION

RELATED APPLICATIONS

This application claims priority to U.S. Provisional Application No. 62/242,510, filed Oct. 16, 2015, U.S. Provisional Application No. 62/242,426, filed Oct. 16, 2015, and U.S. Provisional Application No. 62/270,803, filed Dec. 22, 2015, each of the foregoing applications being fully incorporated by reference herein.

TECHNICAL FIELD

The subject matter described herein relates to fragmentation for rapid data visualization.

BACKGROUND

With businesses moving to electronic based work environments, databases continue to grow in size. In turn, analytical queries associated with these databases also grow. Data visualization of analytical queries play a role in analytical software. The growing cardinality of analytical queries can lead to increased processing times for data visualization on client devices. Visualization of large volumes of data can in turn decrease performance of software architectures.

SUMMARY

In one aspect, a dataset comprising a plurality of data records is received. A plurality of fragments are determined corresponding to the plurality of data records. A fragment identifier table is identified which includes a plurality of fragment codes. Each fragment code uniquely corresponding to each fragment. A fragment is selected from the plurality of fragments. The fragment including a plurality of fragment attributes. Fragment boundary sets are determined based on the plurality of fragment attributes. Each fragment boundary set being unique to each fragment code. An encoded limited cardinality dataset is generated based on the plurality of fragment boundary sets for visualization on a client device.

The plurality of fragments can be determined by filtering the plurality of data records between a range comprising of a minimum value of a domain of interest and a maximum value of the domain of interest. For each fragment, a fragment width can be determined. Each fragment is adjacent to and disjoint from one another.

The fragment boundary set can include a fragment start value and a fragment end value, wherein the fragment start value and the fragment end value are each comprised of a combination of a corresponding fragment code, the minimum value of the plurality of fragment attributes, and the fragment width.

The domain of interest can be determined by a minimum value of the plurality of fragment attributes and a maximum value of the plurality of fragment attributes. The minimum value of the plurality of fragment attributes and the maximum value of the plurality of fragment attributes define a range of values corresponding to the domain of interest.

The fragment width can be determined by a number of fragments of the plurality of fragments and the ratio between the difference of the maximum value of the plurality of fragment attributes and the minimum value of the plurality of fragment attributes.

In some variations, the encoded limited cardinality dataset can include the fragment code, the fragment start value, and the fragment end value. In other variations, the encoded limited cardinality data set can include a number of fragments, a minimum value of domain of interest, and a maximum value of the domain of interest and wherein the number of fragments is sent with the analytical data request. The number of fragments can be set by a client device.

In some variations, the fragment identifier table can be a non-persisted columnar table containing a fragment code that uniquely identifies each fragment of the plurality of fragments. In other variations, the fragment identifier table can be a persisted columnar table containing a fragment code that uniquely identifies each fragment of the plurality of fragments.

In another aspect, a non-transitory computer readable medium contains program instructions. Execution of the program instructions by at least one data processor result in operations that include receiving a dataset comprising a plurality of data records. A plurality of fragments are determined corresponding to the plurality of data records. A fragment identifier table is identified which includes a plurality of fragment codes. Each fragment code uniquely corresponding to each fragment. A fragment is selected from the plurality of fragments. The fragment including a plurality of fragment attributes. Fragment boundary sets are determined based on the plurality of fragment attributes. Each fragment boundary set being unique to each fragment code. An encoded limited cardinality dataset is generated based on the plurality of fragment boundary sets for visualization on a client device.

In yet another aspect, a system includes at least one data processor and memory storing instructions. Execution of the memory storing instructions by at least one data processor results in operations for receiving a dataset comprising a plurality of data records. A plurality of fragments are determined corresponding to the plurality of data records. A fragment identifier table is identified which includes a plurality of fragment codes. Each fragment code uniquely corresponding to each fragment. A fragment is selected from the plurality of fragments. The fragment including a plurality of fragment attributes. Fragment boundary sets are determined based on the plurality of fragment attributes. Each fragment boundary set being unique to each fragment code. An encoded limited cardinality dataset is generated based on the plurality of fragment boundary sets for visualization on a client device.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can add to overall system stability of a system architecture in processing large analytical queries for data visualization. Data fragmentation can assist with limiting the cardinality of data queries can provide faster User Interface (UI) response times on a client device.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
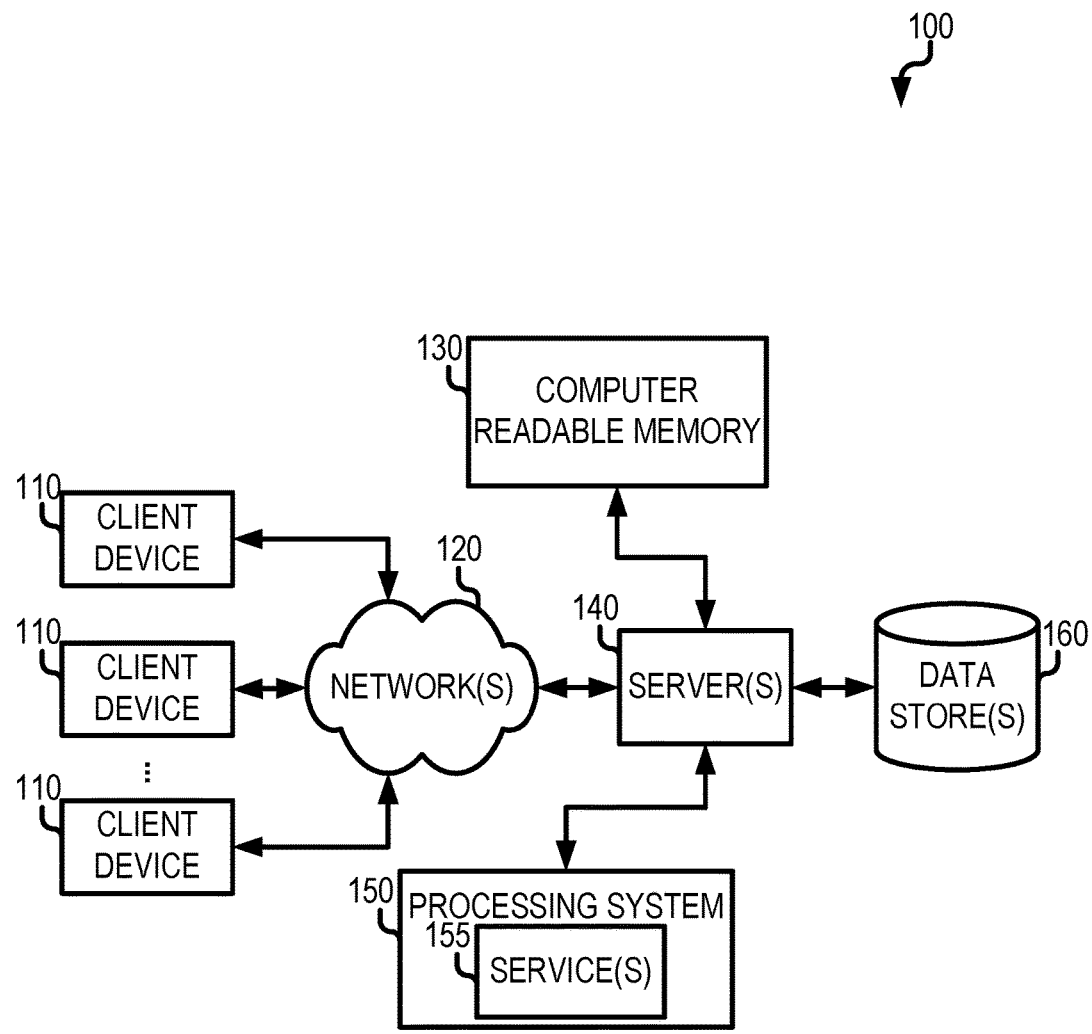
FIG. 1 is a diagrammatic depiction of an example implementation system of a client-server architecture.

FIG. 1 is a diagrammatic depiction of an example implementation system 100 of a client-server architecture. One or more client devices 110 can access one or more servers 140 running one or more services 155 on a processing system 150 via one or more networks 120. One or more servers 140 can access computer-readable memory 130 as well as one or more data stores 160.

Figure 2:
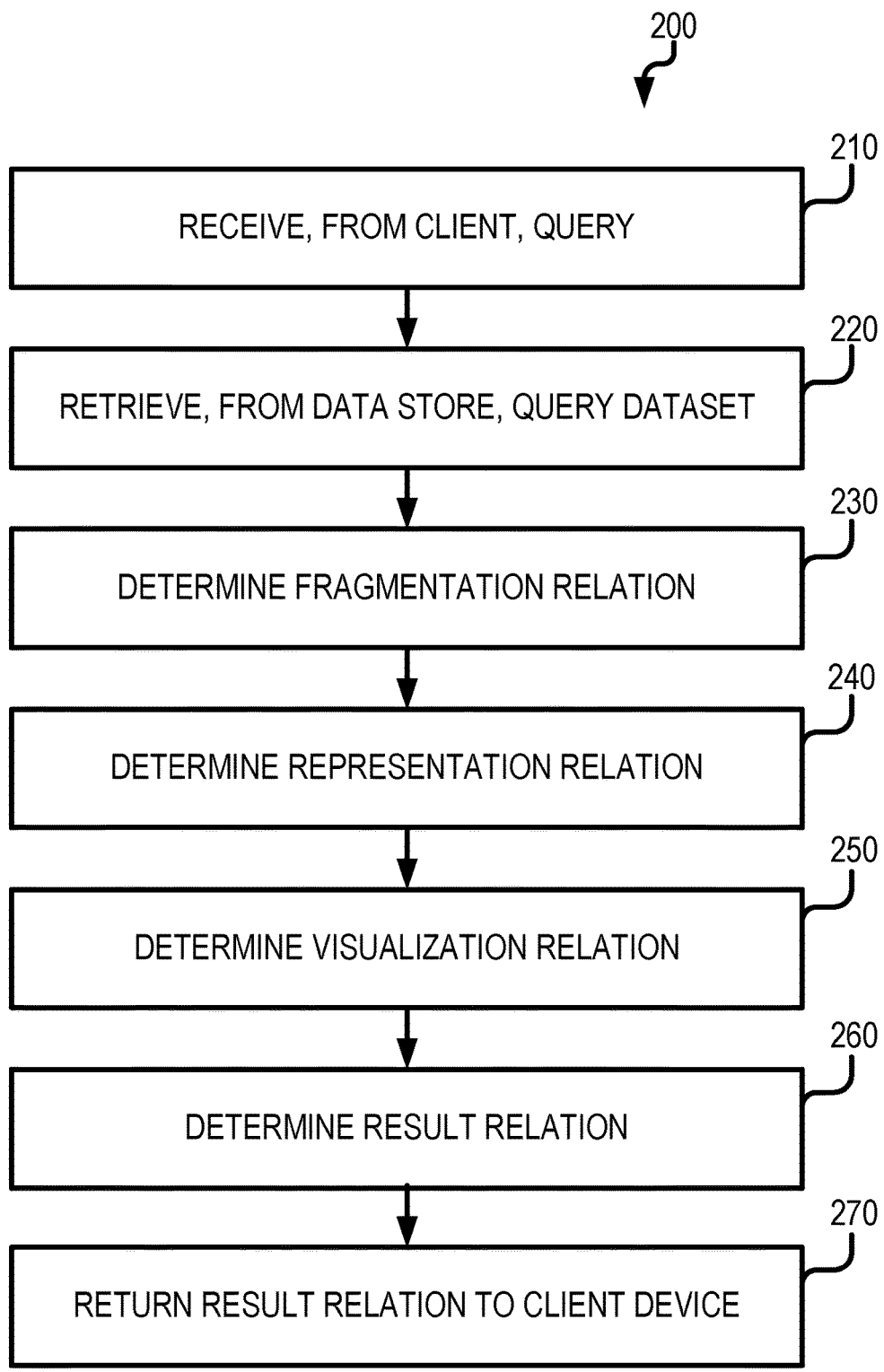
FIG. 2 is a process flow diagram illustrating limiting dataset cardinality for rapid data visualization.

Fragmentation can be applied to a dataset in order to limit the cardinality of a dataset associated with a query. Fragmentation can be applied independently of the number of data records within a dataset. Fragmentation of a dataset can occur within an in-memory database. FIG. 2 is a process flow diagram 200 illustrating limiting the cardinality of data for rapid data visualization in which a query can be received, at 210, from one or more client devices 110. The query can be of a plurality of data records stored in one or more data stores 160. The query can define a domain of interest. The query can also contain a plurality of query parameters. In one aspect, the query parameters can include a number of fragments, a minimum value of a domain of interest, and a maximum value of the domain of interest. In another aspect, the query parameters can include fragment codes, a start value of the fragment, and an end value of the fragment. The domain of interest can be the same for each fragment as it is dependent upon the query dataset. The start and end values can be a fragment boundary set. Each fragment code can associate with a different fragment boundary set.

In response to the query, a query dataset can be retrieved, at 220, from one or more data stores 160. The query dataset (i.e., original relation) can be comprised of a plurality of data records responsive to the query having a plurality of fragments. The plurality of fragments can be filtered between a range. The range can span from the minimum value of the domain of interest to the maximum value of the domain of interest.

A fragmentation relation can be determined at 230. The fragmentation relation can be defined to split the query dataset into a set of fragments. The set of fragments are disjoint. The fragmentation relation can define one or many fragmentation functions. The fragmentation relation can be comprised of a fragmentation function encoding, a fragment code, and a plurality of fragmentation attributes. The fragmentation attributes can be a subset of attributes of the original relation (i.e., the query dataset). The fragmentation function encoding can uniquely identify a fragmentation function. Splitting of data can occur based on the fragmentation attributes. The fragmentation can be static or dynamic based on the fragmentation function encoding.

For static fragmentation, the fragmentation relation can be a fixed relation (i.e., persisted in a table). Alternatively, the fragmentation relation can be an unfixed relation (i.e., non-persisted table).

For dynamic fragmentation, the fragmentation relation can be computed based on the attributes of the original relation (i.e., query dataset). The original relation can be sorted in an ascending order based on the fragmentation attributes. The fragmentation function can split the sorted relation into disjoint intervals. The parameters associated with the fragmentation function can be comprised of a minimum value of the domain of interest, a maximum value of the domain of interest, and a number of fragments.

A representation relation can be determined at 240. The representation relation can associate the original relation (i.e., query dataset) with the fragmentation relation based on the set of fragmentation attributes via a join operation. The representation relation can determine some fragmentation of the original relation (i.e., query dataset) through the fragmentation relation.

A representation function can map each attribute of the query dataset to one fragment code. The fragment code attribute and attributes of the original relation can be appended to the query data set using a join operation. The value taken by the fragment code attribute, for example, can start with '1' and can be subsequently incremented by '1' each time an attribute belongs to a different fragment. The values of the fragment code attribute is unique for each subset of attributes belonging to unique fragments.

A visualization relation can be determined at 250. The visualization relation can select each attribute having the same fragment code by applying aggregation functions. The visualization relation can then join the result relation with the original relation. The aggregation function depends on the representation function through the fragment codes. The aggregation function can be simple or complex. The attributes belonging to a unique fragment code are passed as inputs to one or more aggregation functions.

The result of each aggregated set of attributes can define the visualization relation. The visualization relation can join the representation relation with one or many visualization attributes. Each visualization attribute can express a visualization attribute of an entire fragment by a single value. The single value can be computed over a set of rows identified by a fragment code in the representation relation. The value of a visualization attribute can be determined by its aggregation function. Such aggregation functions can include a summation of downtimes of a client device over a period of time. Alternatively, the aggregation can be an average output over the same period. The visualization relation can be comprised of attributes of the original relation, one or more fragment codes associated with each tuple, the fragmentation attributes, and the visualization attributes. Visualization attributes required for visualization can depend on the visualization system of one or more client devices 110.

A result relation can be determined, at 260, based on the visualization relation. The result relation can be a projection of the fragment code and of the visualization attributes from the visualization relation. The result relation can be comprised of attributes of the fragmentation relation such as fragment codes, and the visualization attributes as required for rendering on one or more client devices 110. The result relation will contain one row per fragment. This row is a representative of the fragment and can be uniquely identified by a fragment code. The plurality of aggregated attributes can be mapped to a plurality of representatives. The result relation can be returned to one or more client devices, at 270, for subsequent rending on a graphical user interface of one or more client devices 110.

Figure 3A:
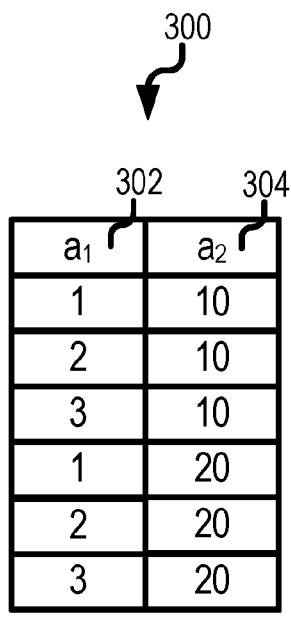
FIG. 3A-3D are example intermediary data outputs associated with limiting dataset cardinality for rapid data visualization.
Figure 3B:
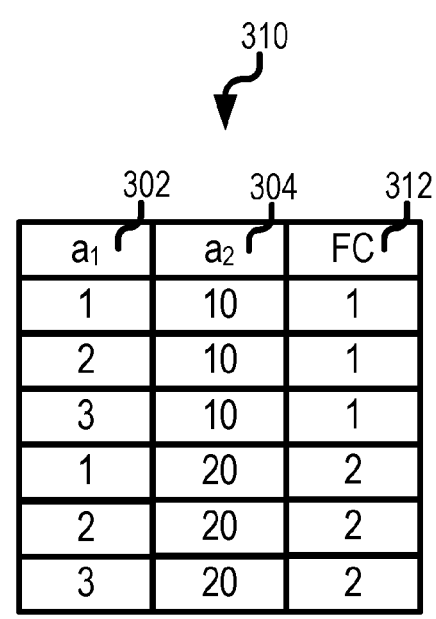
Figure 3C:
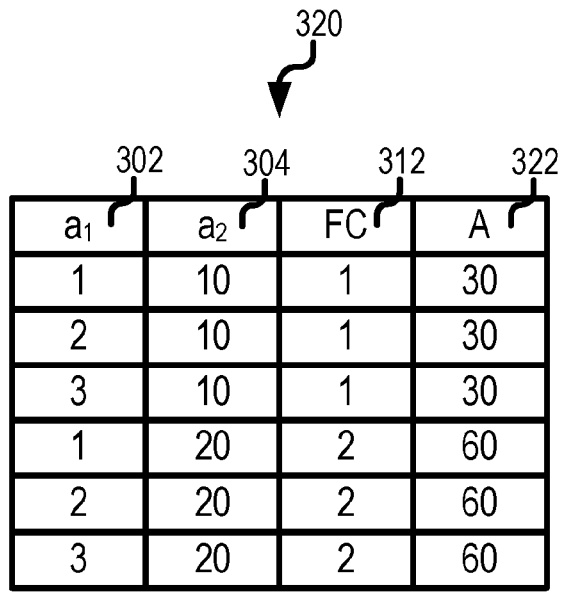
Figure 3D:
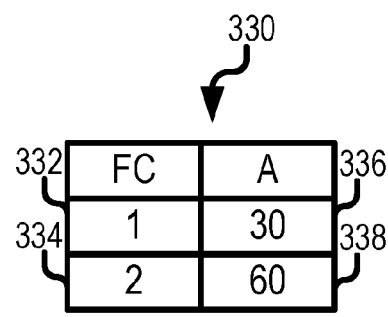

FIG. 3A-3D are example intermediary data outputs associated with limiting dataset cardinality for rapid data visualization. FIG. 3A is an example fragmented relation 300 split into a set of disjoint fragments having fragmentation attributes $a_1$ (i.e., 302) and $a_2$ (i.e., 304) after 230 has been applied to a received query dataset. FIG. 3B is an example representation relation 310 having associated fragmentation codes (i.e., 312) resulting from the application of 240 to fragmented relation 300. FIG. 3C is an example visualization relation 320 having aggregated data 322 resulting from the aggregation of attributes having the same fragment code of 250. For example purposes only, a summation aggregation function has been applied to result in aggregated data 322. Other aggregation functions can also be applied including functions such as an arithmetic mean, count, maximum, nanmean, median, minimum, and/or mode. FIG. 3D is an example of a result relation 330 after the mapping, using the fragment code, a plurality of representatives (i.e., 332, 334) to a plurality of aggregated attributes (i.e., 336, 338).

Figure 4:
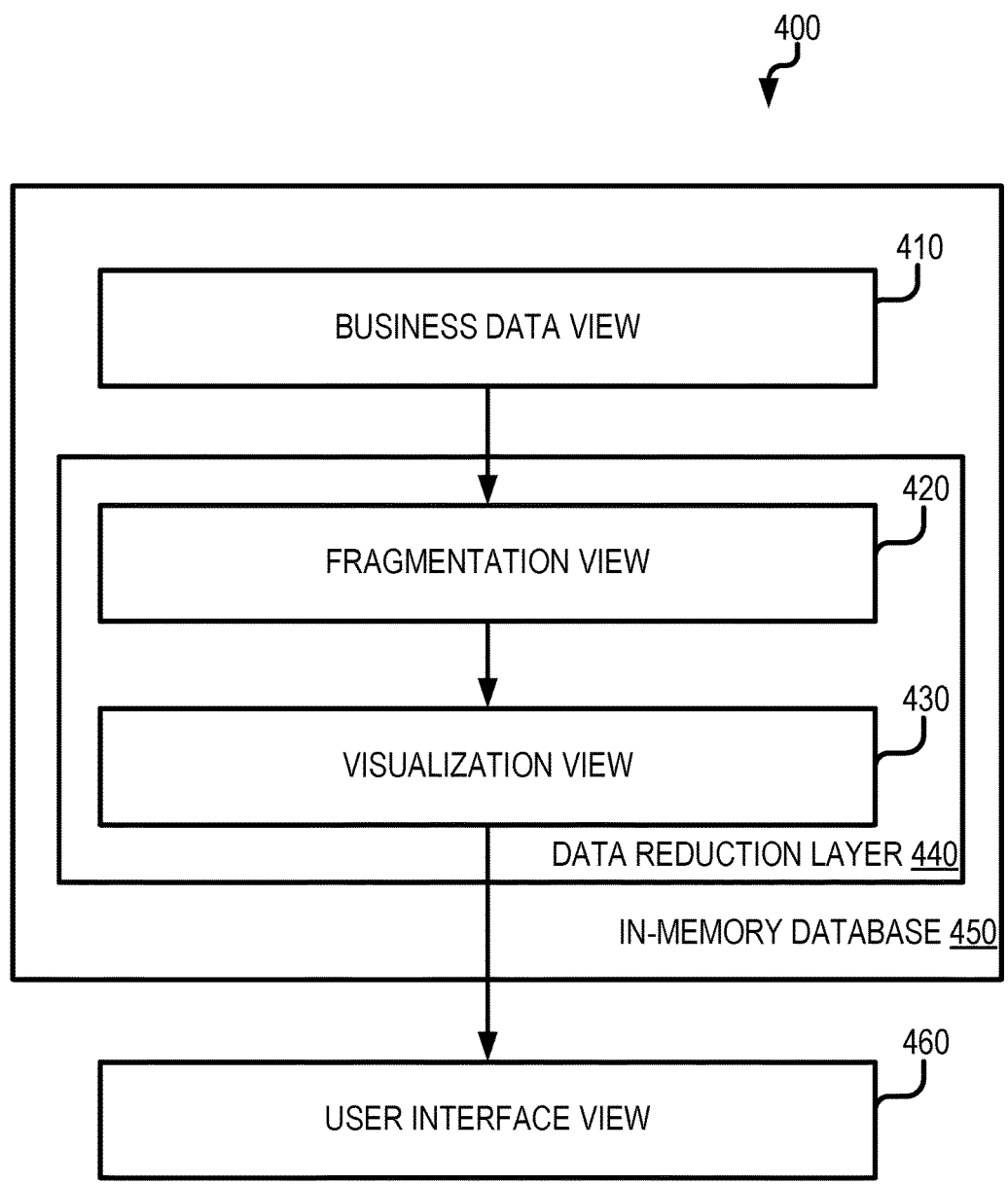
FIG. 4 is a block diagram of an example system architecture for a fragmentation data model.

FIG. 4 is a block diagram of an example system architecture 400 for implementing the subject matter described herein. One or more client devices 110 can dynamically control the cardinality response of one or more servers 140 through a parameter sent with a query request initiated from one or more client devices 110. The cardinality can be reduced to a fixed value, depending on measured processing power and on the chart type. For example, when rendering a column chart with '10000' columns on a computing device, the cardinality can be limited to display '10' of the original '10000' columns.

One or more servers 140 can include in-memory database 450. In-memory database 450 can comprise business data view 410 and data reduction layer 440. Visualization view 430 and fragmentation view 420 can belong to data reduction layer 440. Visualization view 430 can provide result relations to user interface view 460. User interface view 460 can be included on one or more client devices 110.

Business data view 410 can be comprised of a plurality of data records associated with a query dataset. One or more client devices 110 can send a query to one or more servers 140 to view data stored in one or more data stores 160. One or more servers 140 can execute this request by querying the one or more data stores 160 for data records associated with the analytical data request.

Fragmentation view 420 can be comprised of the representation relation and result relation of the business data view 410. Fragmentation of business data view 410 can be achieved via static fragmentation function or dynamic fragmentation function as described herein. Visualization view 430 can be comprised of the visualization relation attributes.

Figure 5:
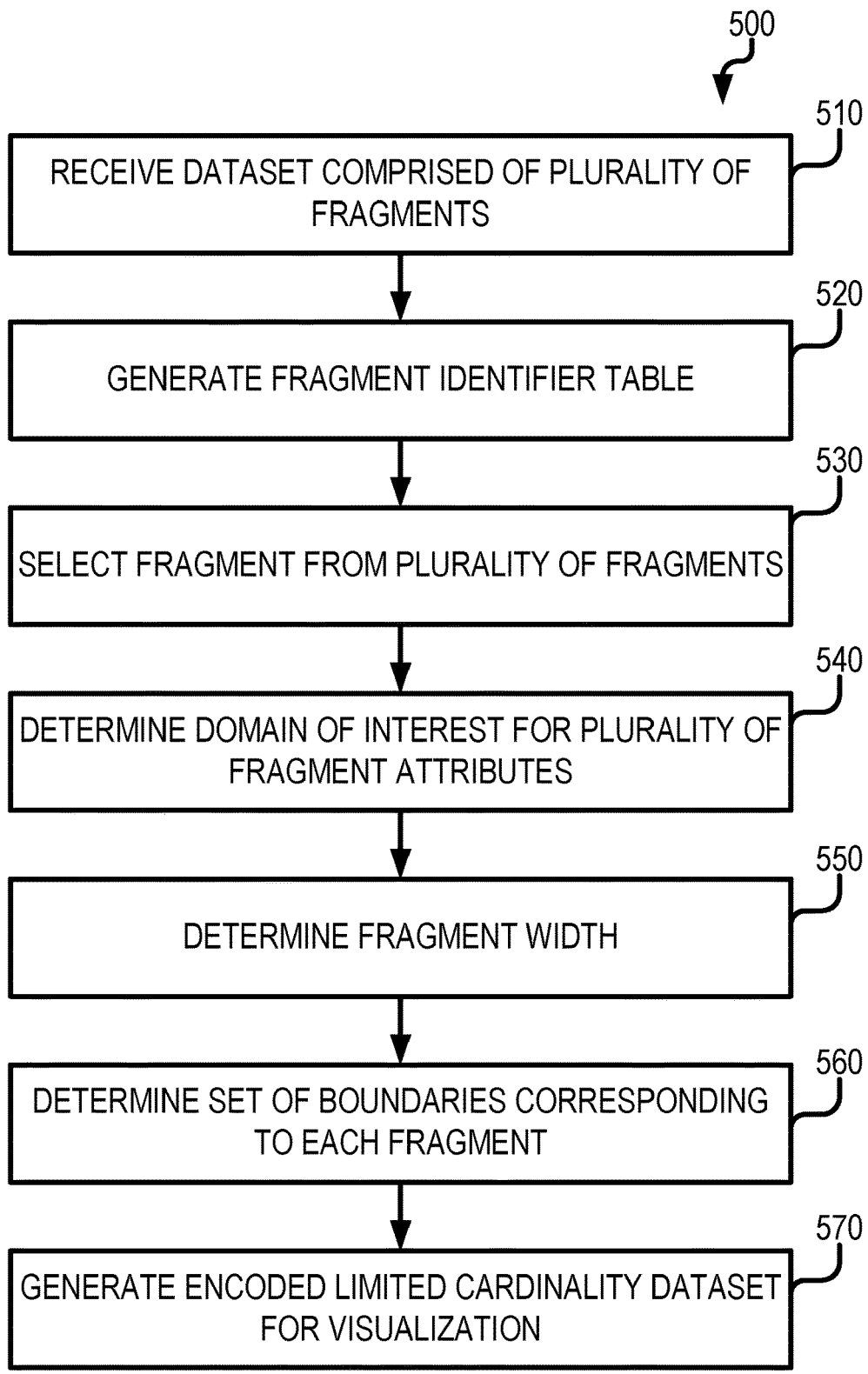
FIG. 5 is a process flow diagram illustrating fragmentation.

FIG. 5 is a process flow diagram 500 illustrating fragmentation. Fragmentation can be applied to limit a response time of one or more data processors to be a constant amount of time. In order to define a fragmentation function, one or more servers 140 can receive a dataset, at 510, comprised of a plurality of data records. Based on the plurality of data records, the corresponding plurality of fragments can be determined by generating a fragment identifier table at 520. The fragment identifier table can be a non-persisted columnar table corresponding to the plurality of fragments. Each fragment in the fragment identifier table can be mapped to a subset of tuples (rows) of the original relation. Each fragment code uniquely identifies each fragment.

A fragment of the plurality of fragments can be selected, at 530, for fragmentation. Each fragment of the plurality of fragments can be comprised of a plurality of fragment attributes. A domain of interest for the plurality of fragment can be determined at 540. The domain of interest can be defined by a range of values between a minimum value and a maximum value associated with the complete set of values of the plurality of fragmentation attributes. Alternatively, the domain of interest can be defined by a range of values between a minimum value and a maximum value of a subset of values of the plurality of fragmentation attributes.

The minimum and maximum values of the plurality of fragmentation attributes can be obtained by ordering the data of the plurality of fragments either an ascending or descending order. A first row of the fragmentation relation can then be selected corresponding to a minimum or maximum value of the ascending or descending table, respectively.

A width corresponding to each fragment of the plurality of fragments can be determined at 550. The fragment width can be the difference between a start value and an end value of a fragment boundary set. The width of an interval can be computed by the fragmentation function. In some cases, the width can be a constant. In other cases, the width can be variable (i.e., on a logarithmic scale). The fragmentation function can be determined by first projecting the fragmentation attributes from the original relation. For each row, a fragment code and fragmentation function can be determined. The value of the fragment code can be a consecutively increased integer value, starting with '1'. The dynamic fragmentation function encoding can be comprised of a minimum value of the domain of interest, a maximum value of the domain of interest, and a number of fragments. In such case, the width can be of a derived value. Each fragment can be adjacent to one another such that the domain of interest is covered with no gaps in between the fragments.

In one aspect, the plurality of fragments considered can be equidistant so that the distance between the minimum and maximum value of the plurality of fragment attributes of each fragment are equal. If a fragment contains no data, the fragment can be excluded from fragmentation view 420.

The width of each fragment can be determined by the equation:

$$fragment_{width} = \frac{max_v - min_v}{no_{fragments}},$$

where $max_v$ is the maximum value of the plurality of fragment attributes, $min_v$ is the minimum value of the plurality of fragment attributes, and $no_{fragments}$ is the number of fragments that can be defined by a parameter encoded in the analytical data request received from one or more client devices 110.

A fragment boundary set corresponding to each fragment can be determined at 560 and defined by a start value and an end value. These values can be comprised of a combination of a fragment attribute code, the minimum value of the plurality of fragment attributes, and the fragment width using the following equations:

$$start_{value} = min_v + fragment_{width} * (Fragment_{code} - 1) \text{ and}$$

$$end_{value} = min_v + fragment_{width} * (Fragment_{code}).$$

An encoded limited cardinality dataset can be generated, at 570, by joining the plurality of fragments based on the fragment boundary set corresponding to each fragment. In aspect, the fragment attribute is greater and/or equal to the minimum value of the plurality of fragments and that the fragment attribute is smaller than the maximum value of the plurality of fragments. In another aspect, a fragment width that is not an integer can indicate the fragment attribute does not belong to the plurality of fragments. This data can be grouped with the plurality of fragment attributes of the last fragment.

A set of fragmentation attributes can, for example, be associated with "Time." The domain of interest can be given by parameters MinDoI, the minimum value of the domain of interest, and MaxDoI, the maximum value of the domain of interest. The MinDoI and MaxDoI parameters, along with a number of fragments, can define a filter for a plurality of data records stored in one or more data stores 160 such that MinDoI is of a less or equal value to the values in "Time" and less than MaxDoI. The fragmentation function encoding can comprise of a start value and end value that represent filter encoding. A plurality of values of the fragment codes associated with "Time" attributes can be within the range of values from '1' to the number of fragments.

In this case, the plurality of values for a fragment code equal to value 'i' can be defined by the following pseudo code:

$$Start_{i=0} = MinDoI,$$

$$End_{i=NoF} = MaxDoI,$$

when $0 \leq i$ AND $i < NoF$: $End_i = Start_{i+1}$, and $$Start_i \leq End_i,$$

where i is an incremental value, NoF is the number of fragments, MinDoI is the minimum value of the domain of interest, and MaxDoI is the maximum value of the domain of interest.

The encoded filter for a fragment identified by a fragment code can be comprised of the pseudo code:

$$Filter = Start(fc) \leq A_F < End(fc).$$

where Filter is the defined filter to be applied to the plurality of data records stored in one or more data stores 160 and $A_F$ is the plurality of fragmentation attributes. When selecting data on the UI of a chart, the selection is used in a navigation to another chart. A selection on the UI is associated to a selection on fragments (fragment codes). The selection on the UI is converted into filters in terms of unique fragment codes.

Figure 6:
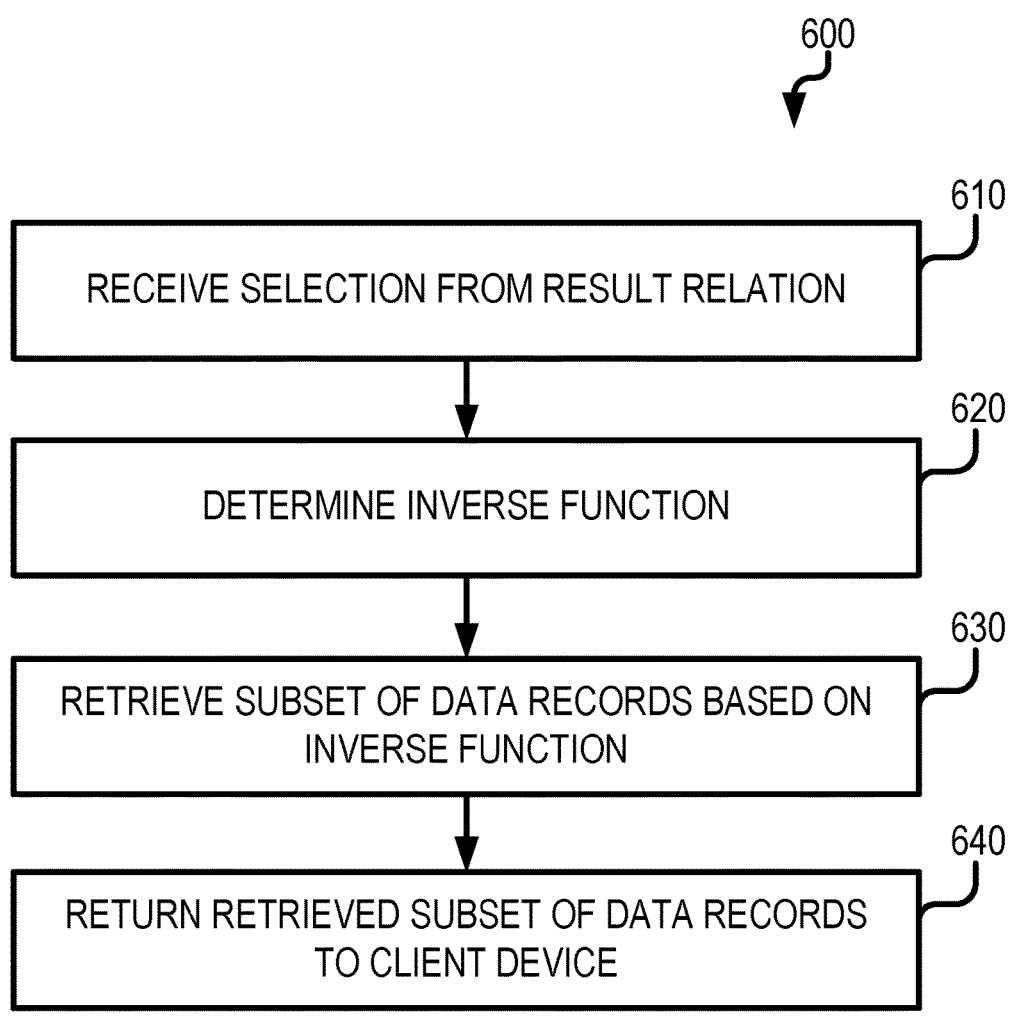
FIG. 6 is a process flow diagram illustrating interpretation of a user selection from a result relation.

FIG. 6 is a process flow diagram 600 illustrating interpretation of a user selection from a limited cardinality dataset (i.e., result relation). A selection from the result relation can be received, at 610, from a graphical user interface of one or more client devices 110. An inverse function can be determined, at 620, based on the received selection. The inverse function can determine the fragmentation applied to a previous query after the representative fragments have been returned to one or more client devices 110. Use of the inverse function can allow for the selection to be mapped back to data records stored in one or more data stores 160. View to view navigation between one or more applications running at one or more client devices 110 can use the inverse function by applying the selection as a filter on a query dataset.

The inverse function can be determined based on either static or dynamic fragmentation. For static fragmentation, an identifier can determine the inverse function by selecting the identifier in the fragmentation function and joining the result with the original relation based on the set of fragmentation attributes.

For dynamic fragmentation, the inverse function can be determined by a minimum value of the domain of interest, a maximum value of the domain of interest, and a number of fragments. The inverse can be used to determine the fragmentation relation of the original relation. The representation relation can be determined by joining the original relation based on the fragmentation attributes.

The inverse function can define a mapping of one or more fragments back to the corresponding attributes in the query dataset. Mapping can be achieved in variety of ways. One way to achieve mapping of the selection from the plurality of representatives back to the original dataset can be based on the number of fragments, the minimum and maximum values of the domain of interest, and the fragment code. The fragmentation encoding function, the number of fragments, and/or the fragment code attributes can be sent as parameters in the selection by one or more client devices 110.

Another way to achieve mapping can be based on the fragment width, the minimum value of the domain of interest and, the maximum value of the domain of interest, and the fragment code. Another way to achieve mapping when the source view and the target view have the same fragmentation attribute can be based on the start and end values of each fragment. Mapping can also be achieved by using the fragment code as a filter condition. In response to a user selecting a representative from the graphical user interface of one or more client devices 110, a request for a new relation (or database view) can be triggered. One or more servers 140 can first map back the selected fragment codes to the tuples (i.e., rows) of the query dataset. Selection on fragments can be defined as a filter. When the data of the selected filters is obtained from the source relation, it can be joined with the data of a second view based on a common attribute.

Based on the inverse function, a subset of data records corresponding to the selection can be retrieved, at 630, from a database. The database can be, for example, an in-memory database. The retrieved subset of data records can then be returned, at 640, to one or more client devices 110. Alternatively, the retrieved subset of data records undergo fragmentation and the result set corresponding to the second fragmentation can be returned. One or more client devices can render the returned subset of data records to a user via a graphical user interface.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for fragmentation implemented by one or more data processors of at least one computing device, the method comprising:
 receiving, by at least one data processor of a computing device, a dataset comprising a plurality of data records;
 determining, by at least one data processor, a plurality of fragments corresponding to the plurality of data records by:
  filtering, by at least one data processor, the plurality of data records between a range comprising of a minimum value of a domain of interest and a maximum value of the domain of interest; and
  determining, by at least one data processor, for each fragment, a fragment width, wherein each fragment is adjacent to and disjoint from one another;
 generating, by at least one data processor, a fragment identifier table comprised of a plurality of fragment codes, each fragment code uniquely corresponding to each fragment;
 selecting, by at least one data processor, a fragment of the plurality of fragments, the fragment comprised of a plurality of fragment attributes;
 determining, by at least one data processor, a plurality of fragment boundary sets, based on the plurality of fragment attributes by determining a fragment start value and a fragment end value, wherein the fragment start value and the fragment end value are each comprised of a combination of a corresponding fragment code, the minimum value of the plurality of fragment attributes, and the fragment width, each fragment boundary set being unique to each fragment code; and
 generating, by at least one data processor, an encoded limited cardinality dataset, based on the plurality of fragment boundary sets, for visualization on a client device.

2. The method according to claim 1, wherein the domain of interest comprises a minimum value of the plurality of fragment attributes and a maximum value of the plurality of fragment attributes, wherein the minimum value of the plurality of fragment attributes and the maximum value of the plurality of fragment attributes define a range of values corresponding to the domain of interest.

3. The method according to claim 1, wherein the fragment width is determined by a number of fragments of the plurality of fragments and a ratio between the difference of the maximum value of the plurality of fragment attributes and the minimum value of the plurality of fragment attributes.

4. The method according to claim 3, wherein the number of fragments is set by a client device.

5. The method according to claim 1, wherein the encoded limited cardinality dataset is comprised of the fragment code, the fragment start value, and the fragment end value.

6. The method according to claim 1, wherein encoded limited cardinality dataset is comprised of a number of fragments, a minimum value of domain of interest, and a maximum value of the domain of interest and wherein the number of fragments is sent with the analytical data request.

7. The method according to claim 1, wherein the fragment identifier table is a non-persisted columnar table containing a fragment code that uniquely identifies each fragment of the plurality of fragments.

8. The method according to claim 1, wherein the fragment identifier table is a persisted columnar table containing a fragment code that uniquely identifies each fragment of the plurality of fragments.

9. The method according to claim 1, wherein the plurality of data records are stored in an in-memory database.

10. A system comprising:
 at least one data processor;

memory storing instructions, which when executed by at least one data processor, result in operations comprising:
  receiving a dataset comprising a plurality of data records;
  determining a plurality of fragments corresponding to the plurality of data records by:
    filtering the plurality of data records between a range comprising of a minimum value of a domain of interest and a maximum value of the domain of interest; and
    determining, for each fragment, a fragment width, wherein each fragment is adjacent and disjoint from one another;
  generating a fragment identifier table comprised of a plurality of fragment codes, each fragment code uniquely corresponding to each fragment;
  selecting a fragment of the plurality of fragments, the fragment comprised of a plurality of fragment attributes;
  determining a plurality of fragment boundary sets, based on the plurality of fragment attributes, by determining a fragment start value and a fragment end value, wherein the fragment start value and the fragment end value are each comprised of a combination of a corresponding fragment code, the minimum value of the plurality of fragment attributes, and the fragment width, each fragment boundary set being unique to each fragment code; and
  generating an encoded limited cardinality dataset, based on the plurality of fragment boundary sets, for visualization on a client device.

11. The system according to claim 10, wherein the memory storing instructions are stored within an in-memory database.

12. The system according to claim 10, wherein the fragment width is determined by the ratio between the difference of the maximum value of the plurality of fragment attributes and the minimum value of the plurality of fragment attributes, and a number of fragments of the plurality of fragments.

13. The system according to claim 12, wherein the number of fragments is set by a client device.

14. The system according to claim 10, wherein the encoded limited cardinality dataset is comprised of the fragment code, the fragment start value, and the fragment end value.

15. The system according to claim 10, wherein encoded limited cardinality dataset is comprised of a number of fragments, a minimum value of domain of interest, and a maximum value of the domain of interest and wherein the number of fragments is sent with the analytical data request.

16. A non-transitory computer readable medium containing program instructions, which when executed by at least one data processor, result in operations comprising:
  receiving a dataset comprising a plurality of data records;
  determining a plurality of fragments corresponding to the plurality of data records by:
    filtering the plurality of data records between a range comprising of a minimum value of a domain of interest and a maximum value of the domain of interest; and
    determining, for each fragment, a fragment width, wherein each fragment is adjacent and disjoint from one another;
  generating a fragment identifier table comprised of a plurality of fragment codes, each fragment code uniquely corresponding to each fragment;
  selecting a fragment of the plurality of fragments, the fragment comprised of a plurality of fragment attributes;
  determining a plurality of fragment boundary sets, based on the plurality of fragment attributes by determining a fragment start value and a fragment end value, wherein the fragment start value and the fragment end value are each comprised of a combination of a corresponding fragment code, the minimum value of the plurality of fragment attributes, and the fragment width, each fragment boundary set being unique to each fragment code; and
  generating an encoded limited cardinality dataset, based on the plurality of fragment boundary sets, for visualization on a client device.

17. The non-transitory computer readable medium according to claim 16, wherein the fragment width is determined by the ratio between the difference of the maximum value of the plurality of fragment attributes and the minimum value of the plurality of fragment attributes, and a number of fragments of the plurality of fragments.

18. The non-transitory computer readable medium according to claim 17, wherein the number of fragments is set by a client device.

19. The non-transitory computer readable medium according to claim 16, wherein the encoded limited cardinality dataset is comprised of the fragment code, the fragment start value, and the fragment end value.

20. The non-transitory computer readable medium according to claim 16, wherein encoded limited cardinality dataset is comprised of a number of fragments, a minimum value of domain of interest, and a maximum value of the domain of interest and wherein the number of fragments is sent with the analytical data request.

* * * * *